United States Patent [19]
Goebel et al.

[11] 3,741,023
[45] June 26, 1973

[54] TOOL CHANGING MECHANISM FOR A MACHINE TOOL

[75] Inventors: Hellmut Goebel, Reutlingen; Ernst Raiser, Rommelsbach, both of Germany

[73] Assignee: BW-Weber Verwaltungsgesellschaft m.b.H., Reutlingen, Germany

[22] Filed: May 24, 1971

[21] Appl. No.: 146,130

[30] Foreign Application Priority Data
June 6, 1970  Germany.................. P 20 27 876.6

[52] U.S. Cl. ............................. 74/110, 29/200 D
[51] Int. Cl. ........................................... F16h 21/44
[58] Field of Search ................... 29/200 D; 74/110

[56] References Cited
UNITED STATES PATENTS

| | | | |
|---|---|---|---|
| 1,517,525 | 12/1924 | Ault ..................................... | 74/110 |
| 2,402,027 | 6/1946 | Crowther ............................. | 74/110 |
| 2,766,631 | 10/1956 | Van Sittert ......................... | 74/110 |
| 3,368,265 | 2/1968 | Kirkham ............................. | 29/200 D |
| 3,293,734 | 12/1966 | Buckley ............................. | 29/200 D |

*Primary Examiner*—Charles J. Myhre
*Assistant Examiner*—Wesley S. Ratliff, Jr.
*Attorney*—Arthur O. Klein

[57] ABSTRACT

An improvement in a tool changing mechanism of the type as disclosed in the U.S. Pat. No. 3,551,984 according to which two laterally adjacent gripping devices are alternately movable back and forth in a common guide element along separate guideways which are partly curved toward each other so that the gripping heads of both devices are alternately movable to the same point to pick up or deliver different tools at identical positions and the paths of the last part of the forward movements of both gripping devices extend nearly parallel and closely adjacent to each other and even the rear straight parts of the guideways may be spaced at a relatively small distance from each other, thus permitting the common guide element to be made of a narrow width.

6 Claims, 3 Drawing Figures

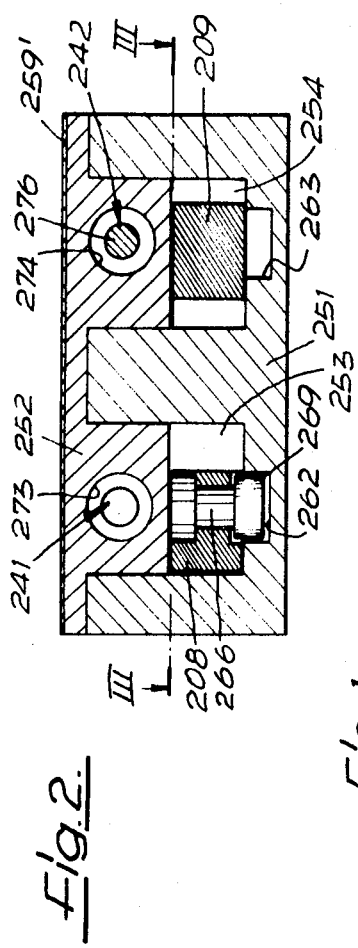
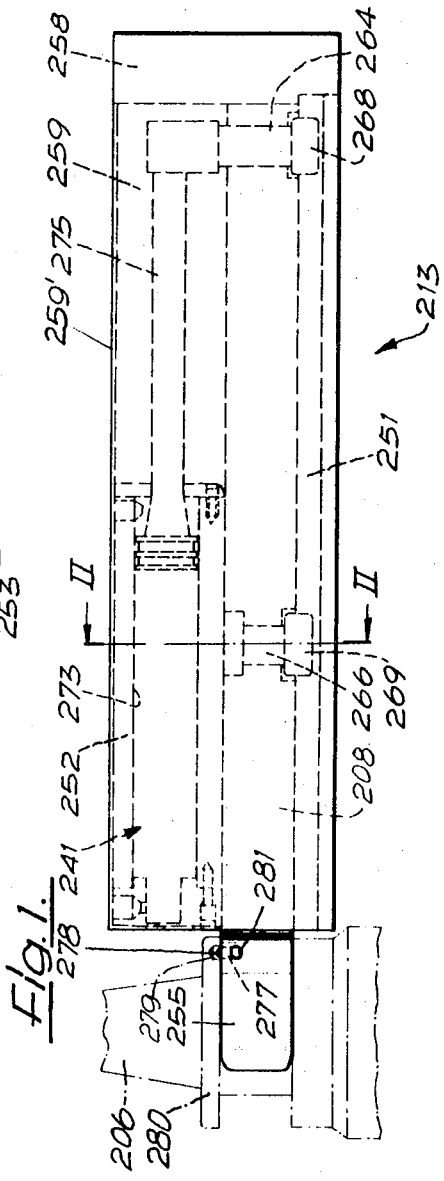

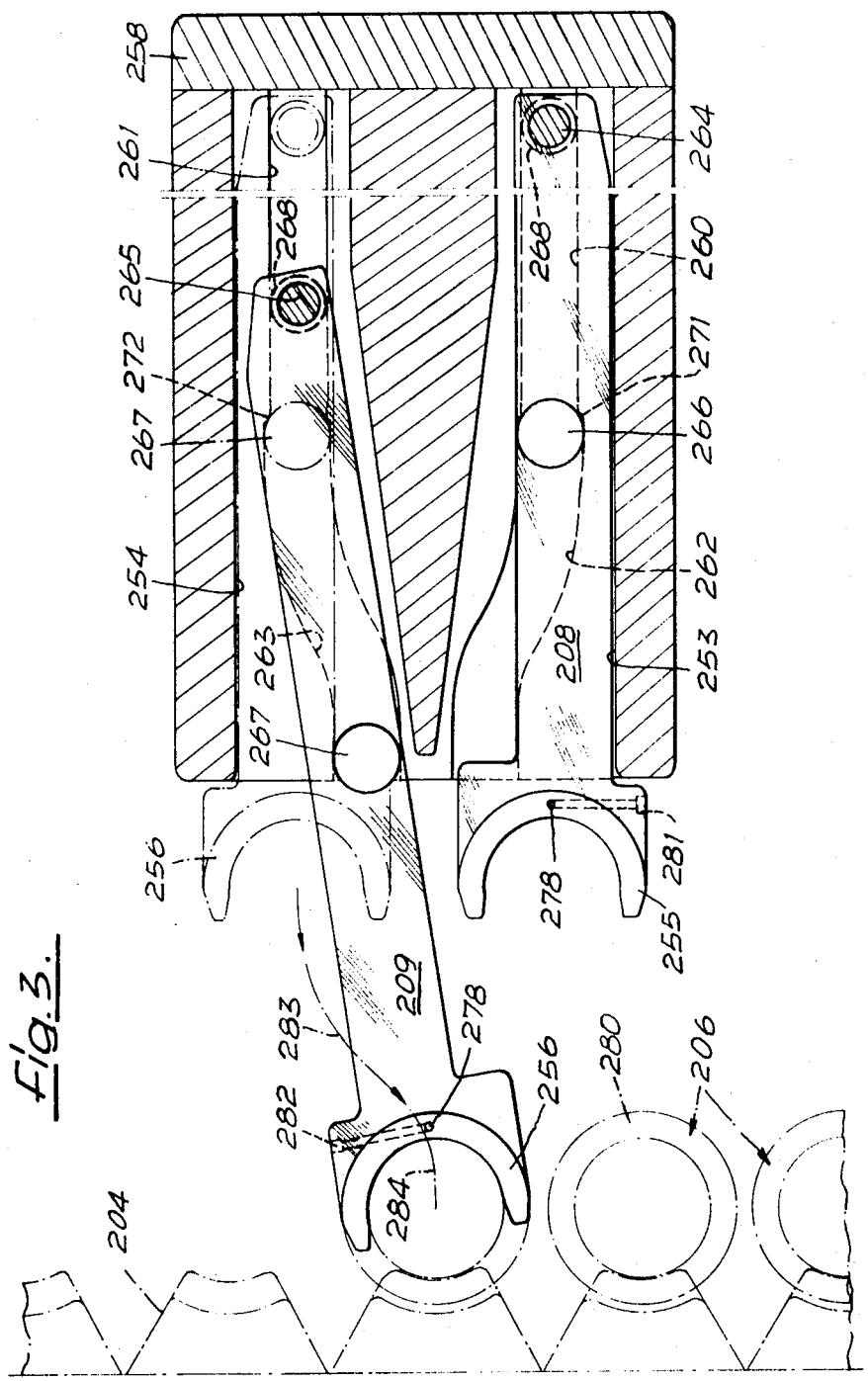

TOOL CHANGING MECHANISM FOR A MACHINE TOOL

The present invention relates to a tool changing mechanism for a machine tool and more particularly to improvements in a tool changing mechanism as disclosed in our U.S. Pat. No. 3,551,984 which comprises a tool magazine for different tools, two gripping devices which, when the tools are to be changed, are slidable independently of each other in separate guideways on a common guide element, and further guide means for this guide element which permit the latter to be moved from a magazine position, in which the gripping devices are adapted to remove a tool from the magazine or insert it into the magazine, to a spindle position in which a tool is inserted into or removed from the tool spindle of the machine. The two guideways for the gripping devices on the common guide element are directed toward a common point of action which in the magazine position of the guide element coincides with the position of a tool in the magazine and in the spindle position with the position of the tool spindle of the machine.

Since the guideways for the two gripping devices of the mechanism as above described extend in straight directions toward a common point of action, they converge to each other which requires the common guide element on which these guideways are provided to have a considerable width.

It is an object of the present invention to modify and improve the tool changing mechanism as above described by designing it in a manner so as to permit the common guide element of the gripping devices to be made of the smallest possible width and therefore of a much smaller width than that which was previously required.

For attaining this object, the present invention provides the guideways of the gripping devices of a tool changing mechanism of the same type as above described to be made of a curved shape. Even though the two guideways are likewise directed toward a common point of action of the two gripping devices, such a curved construction of these guideways permits the gripping devices in their retracted positions to be located closely adjacent to each other so that the common guide element may be made of the smallest possible width.

In view of the requirements that the gripping devices should be movable forwardly to the same point of action and be located adjacent to each other in their retracted positions, the gripping devices when guided in straight directions must necessarily be movable toward a row of tools in the magazine in directions extending obliquely to the plane of this row. Since in accordance with the invention the guideways are made of a curved shape, it is now possible to guide each of the gripping devices at least during the last part of their movement toward the tool magazine in a direction extending almost at a right angle to the plane of this row of tools which permits this magazine to be designed so as to hold the tools in positions very closely adjacent to each other without danger that a tool which is adjacent to the tool which is being gripped by the gripping device will interfere with the latter.

One feature of a preferred embodiment of the invention consists in providing the gripping devices with guide pins which engage into and are movable along curved guideways. Each gripping device may then be provided with a front guide pin and a rear guide pin which are movable along different guideways.

Another feature of the invention consists in providing the two guideways for the two guide pins of each gripping device in the form of two grooves which extend into each other and in making the front guide pin and its guide groove of a greater width than the rear guide pin and its guide groove, so that when employing guide rollers which are mounted so as to be rotatable about the guide pins, the front guide rollers will be rotatably mounted on stronger supports.

Another advantageous feature of the invention consists in providing the rear guide pin on the rear end of the gripping device and in providing a hydraulic or pneumatic drive unit which acts upon this rear guide pin.

The features and advantages of the present invention will become more clearly apparent from the following detailed description thereof which is to be read with reference to the accompanying drawings, in which FIG. 1 shows a side view of one embodiment of the invention;

FIG. 2 shows a cross section which is taken along the line II—II of FIG. 1; while FIG. 3 shows a cross section which is taken along the line III—III of FIG. 2.

Insofar as its general construction and mode of operation are concerned, the tool changing mechanism to which the present invention relates is basically similar to the mechanism according to our previous invention as disclosed in our previous application or patent referred to above and as also briefly described above, and also for this reason those elements of this mechanism which will be subsequently described and are illustrated in the accompanying drawings and which are at least functionally similar in both mechanisms will be identified by reference numerals which are increased by 200 over those as applied in our previous disclosure.

According to the present invention, the guide element 213 comprises a longitudinally recessed part 251 and a cylinder part 252 which are rigidly secured to each other, for example, by bolts, not shown. As illustrated in FIG. 1, the cylinder part 252 as such only has approximately one half of the length of the recessed part 251.

The recessed part 251 is provided with a pair of continuous longitudinal recesses 253 and 254 in each of which the rod 208 or 209 of a pair of gripping devices is slidable the gripping head 255 or 256 of which projects from the open front end of the respective recess 253 or 254 even when the entire rod 208 or 209 of the respective gripping device, for example, rod 208 as shown in FIG. 3, is retracted into the respective recess 253 or 254. The rear part of each recess 253 and 254 has a width which is only slightly larger than the width of the respective rod 208 or 209, and the rear part of the partition separating the two recesses from each other has therefore parallel wall surfaces along nearly one half of its entire length, while the walls of slightly more than the other front half of the length of the partition taper equally toward each other so that the two recesses 253 and 254 gradually increase in width toward their front ends, as may be clearly seen in FIG. 3. The narrower rear ends of recesses 253 and 254 are closed by a cover plate 258 which is secured to the recessed part 251 by screws, not shown, and which extends over the rear end of the entire recessed part 251 including the cylinder part 252. Another cover plate 259' covers up the chamber 259 between the cylinder part 252 and the cover plate 258 and also extends over the entire length of the cylinder part 252.

The plane bottom surface of each of the two recesses 252 and 254 is provided with a rear guide groove 260 or 261, respectively, and with a front guide groove 262 or 263, respectively. Each rear guide groove 260 and 261 extends from the rear end of the respective recesses 253 or 254 approximately up to the center of the latter and then continues into the wider front guide groove 262 or 263, respectively, which extends up to the open front end of recess 253 or 254. The two rear guide grooves extend in straight directions parallel to each other, while the opposite ends of the two front guide grooves extend substantially parallel to the rear guide grooves but their central connecting parts are curved inwardly from the rear toward the front ends so that the latter are spaced at a small distance from each other.

The rod 208 and 209 of each gripping device is provided with a rear guide pin 264 or 265, respectively, near its rear end and with a front guide pin 266 or 267, respectively, which is secured to the respective rod near the center of its length. On the ends of these guide pins which engage into the rear and front guide grooves 260 or 261 and 262 or 263, respectively, steel rollers 268 and 269 are rotatably mounted which are slidable along these respective guide grooves.

For reciprocating the gripping rods 208 and 209 in their longitudinal directions, two hydraulic or pneumatic drive units 241 and 242 are provided the cylinder chambers of which are formed by bores 273 and 274 in the cylinder part 252, while the ends of the piston rods 275 and 276 preferably are rotatably connected to the rear guide pins 264 and 265, respectively.

For gripping a tool 206 which is supplied, for example, from a magazine 204, the inside of each of the two heads 255 and 256 on the two gripping rods 208 and 209 is provided with a small hydraulic or pneumatic unit 277 the piston rod 278 of which forms a locking pin which is adapted to engage radially into a bore 279 in a flange 280 of the tool 206. The piston rods 278 are laterally offset relative to the longitudinal axes of the two gripping rods 208 and 209 and in opposite directions to each other so that, when the respective gripping rod is moved to its outer end, the associated piston rod 278 will engage accurately into the bore 279 in flange 280 of tool 206 even though the longitudinal axes of the two gripping rods are inclined in opposite directions to each other. The fluid for moving the piston rod 278 against the action of a return spring into the bore 279 is supplied to the respective head 255 or 256 through a flexible tube which may be connected to an inlet 281 or 282, respectively.

For gripping a tool 206, one of the gripping devices, that is, according to FIG. 3 the gripping rod 209, is moved by the associated hydraulic or pneumatic unit 242 partly out of the recess 254 in such a manner that the head 256 of this rod moves along the path 283 as indicated in dot-and-dash lines in FIG. 3. The end part 284 of this path extends practically at a right angle to the row of tools 207 in magazine 204 so that this gripping head can engage successively with a series of closely adjacent tools 206. As soon as the head 204 has gripped the tool 206, as indicated in FIG. 3, the hydraulic or pneumatic unit 277 is actuated so that piston rod 278 will engage into the bore 279 of tool flange 280 and lock the gripping head 256 to the tool 206, so that when the gripping device 209, 256 is then retracted, the tool will be withdrawn from the magazine 204, the entire guide element 213 may be moved toward the tool spindle of the machine tool where the empty gripping device 208, 255 will be moved forwardly so as to grip and withdraw in the same manner the tool which is mounted in the tool spindle. After this gripping device 208, 255 is retracted into the recess 253, while taking along the tool which it has withdrawn from the tool spindle of the machine, the gripping device 209, 256 may be moved out of the recess 254 and may carry the new tool toward the tool spindle and insert it after a suitable movement of the guide element 213 into the tool spindle.

Due to the curvature of the front guide grooves 262 and 263, it is possible to make the guide element 213 of a very narrow width and to move the gripping heads during the last part of their forward movement and the first part of their retracting movement and also during the last part of their retracting movement and the first part of their forward movement along a path extending in the longitudinal direction of the guide element 213.

Although our invention has been illustrated and described with reference to the preferred embodiment thereof, we wish to have it understood that it is in no way limited to the details of such embodiment but is capable of numerous modifications within the scope of the appended claims.

Having thus fully disclosed our invention, what we claim is:

1. A tool-changing mechanism for a machine tool having a tool magazine for supporting different tools and having a tool spindle, comprising two gripping members for exchanging a tool, each gripping member having a gripping head at its front end adapted to grip a tool, said gripping members being adapted to remove a selected tool from said magazine and also to remove a tool from said tool spindle and then to insert these tools into said tool spindle and into said magazine, respectively, a common guide member for said gripping members, guide members for guiding said guide member so as to be movable between a magazine position adjacent to said magazine and a spindle position adjacent to said tool spindle, means for moving said guide member along said guide means from one of said positions to the other, two separate guideways disposed in said guide member along which said two gripping members are slidable independently of each other, said two guideways on said guide member extend in directions intersecting at a common point of action of said heads of said gripping members which point of action in said magazine position and in said spindle position of said guide elements coincides with the position of a tool in said magazine and in said tool spindle, respectively, means for moving said gripping members along said guideways between a first position, in which said heads of said gripping members are remote from said point of action, and a second position in which said heads of said gripping members are adapted to grip a tool, the latter position coinciding with said point of action, the improvement residing in that at least a part of one of said guideways is curved.

2. A tool-changing mechanism as defined in claim 1, in which due to the curvature of said guideway, said gripping members are movable nearly parallel and closely adjacent to each other during the first and last part of their reciprocating movements out of and into said first position, respectively.

3. A tool-changing mechanism as defined in claim 1, in which said gripping members comprise guide means movably engaging into said guideways.

4. A tool-changing mechanism as defined in claim 3, wherein each gripping member has a front guide means adjacent said gripping head and a rear guide means which engage separate front and rear guideways, respectively.

5. A tool-changing mechanism as defined in claim 4, wherein said front guideway and said rear guideway for each of said gripping members merge into one another, and wherein each guide means comprises a roller, each front roller and its associated guideway being wider than the rear guide roller and its associated guideway.

6. A tool-changing mechanism as defined in claim 5, wherein each rear guide roller is located near the rear end of the respective gripping member, a fluid-operated drive means acting upon the rear guide roller by way of a pin.

* * * * *